United States Patent
Burgazzoli et al.

(10) Patent No.: US 12,073,268 B2
(45) Date of Patent: Aug. 27, 2024

(54) DYNAMICALLY ADJUSTING OBJECTS MONITORED BY AN OPERATOR IN A DISTRIBUTED COMPUTER ENVIRONMENT

(71) Applicant: RED HAT, INC., Raleigh, NC (US)

(72) Inventors: Luca Burgazzoli, Piacenza (IT); Paolo Antinori, Novara (IT)

(73) Assignee: RED HAT, INC, Raleigh, NC (US)

( * ) Notice: Subject to any disclaimer, the term of this patent is extended or adjusted under 35 U.S.C. 154(b) by 0 days.

(21) Appl. No.: 17/825,051

(22) Filed: May 26, 2022

(65) Prior Publication Data

US 2023/0385140 A1    Nov. 30, 2023

(51) Int. Cl.
G06F 9/54 (2006.01)
G06F 8/20 (2018.01)
G06F 9/455 (2018.01)

(52) U.S. Cl.
CPC ............ G06F 9/548 (2013.01); G06F 8/24 (2013.01); G06F 9/45558 (2013.01); G06F 9/542 (2013.01); *G06F 2009/4557* (2013.01)

(58) Field of Classification Search
CPC ...... G06F 9/548; G06F 9/45568; G06F 9/542; G06F 8/24; G06F 2009/4557
See application file for complete search history.

(56) References Cited

U.S. PATENT DOCUMENTS

| | | | |
|---|---|---|---|
| 11,010,218 B1 | 5/2021 | Karaya | |
| 2021/0303368 A1* | 9/2021 | Yu | G06F 9/00 |
| 2021/0374156 A1 | 12/2021 | Lenhard et al. | |
| 2022/0027197 A1* | 1/2022 | Tang | G06F 9/5072 |
| 2022/0027217 A1 | 1/2022 | Thoemmes et al. | |
| 2022/0156129 A1* | 5/2022 | Li | G06F 9/542 |
| 2022/0326942 A1* | 10/2022 | Peronnet | G06F 8/71 |
| 2022/0374284 A1* | 11/2022 | Kirmse | G06F 9/5072 |

OTHER PUBLICATIONS

Kaldstrom, "Encoding human-like operation knowledge using declarative Kubernetes operator patterns" Oct. 2021, Aalto University School of Electrical Engineering pp. 1-52.*
"Versions in CustomResourceDefinitions," https://kubernetes.io/docs/tasks/extend-kubernetes/custom-resources/custom-resource-definition-versioning/, Aug. 8, 2021, pp. 1-12.
"Ingress Trait Custom Resource Definition," https://verrazzano.io/latest/docs/reference/api/oam/ingrestrait/, Oracle, 2022, pp. 1-3.
Grin, Volodymyr, "Kubernetes CRDs = Huge Pain In Multi-Tenant Clusters," Loft Labs, Inc., Dec. 9, 2020, pp. 1-5.
Idowu et al., "Creating & Using Configmaps In Kubernetes," BMC Software, Inc., May 5, 2021, pp. 1-16.
Schimanski, Stefan, "Future of CRDs: Structural Schemas," Red Hat, Jun. 20, 2019, pp. 1-5.

* cited by examiner

*Primary Examiner* — Charles E Anya
(74) *Attorney, Agent, or Firm* — Kilpatrick Townsend & Stockton LLP

(57) ABSTRACT

In one example, a system can identify application programming interface (API) object classes specified in a definition file. The definition file can be for a target API object. The system can then update an attribute field associated with the target API object to specify the API object classes. Operator software in a distributed computing environment can be configured to monitor the API object classes specified in the attribute field of the target API object and execute computing logic in response to events related to the API object classes.

20 Claims, 4 Drawing Sheets

---

400
Identify API object classes specified in a definition file for a target API object

402
Update an attribute field associated with the target API object to specify the API object classes, wherein operator software in a distributed computing environment is configured to monitor the API object classes specified in the attribute field of the target API object and execute computing logic in response to events related to the API object classes

DYNAMICALLY ADJUSTING OBJECTS MONITORED BY AN OPERATOR IN A DISTRIBUTED COMPUTER ENVIRONMENT

TECHNICAL FIELD

The present disclosure relates generally to distributed computing environments. More specifically, but not by way of limitation, this disclosure relates to dynamically controlling and updating which objects are monitored by operator software in a distributed computing environment.

BACKGROUND

A distributed computing system is a system in which networked computers coordinate their actions by passing messages to one another. Computers in a distributed system can be physically close together on a local network or geographically distant and connected by a wide area network, such as the Internet. A distributed computing system can include a variety of devices, such as servers, mainframes, personal computers, workstations, and smartphones. Because distributed computing systems can be complex, it has become increasingly common for distributed computing systems to include automation software to automate various repeatable tasks. One example of automation software is a container orchestration platform. A container orchestration platform can automate the deployment, scaling, and management of software components (e.g., applications and microservices) inside containers to significantly reduce the workloads of users.

Kubernetes is one popular container orchestration platform that can be deployed on a distributed computing system. Distributed computing systems that are running Kubernetes may be referred to as Kubernetes environments. Kubernetes environments can include operators and other controller software for automating various repeatable tasks, such as deployment and scaling of software components. An operator is a software extension to Kubernetes that can manage said software components. Once deployed, operators can create, configure, and manage instances of their assigned software components on behalf of a user in a declarative way. For example, an operator can monitor the state of an assigned software component and perform one or more reconciliation operations in response to detecting a state change.

In some cases, the operators can monitor and manage objects. In the context of Kubernetes, such objects can include application programming interface (API) objects that have one or more characteristics specified in definition files. The API objects can be data objects stored in a database that may be internal to the Kubernetes environment, where the data objects can represent running processes in the distributed computing environment. For example, a Pod object can be a data object that is stored in a database and that represents a running pod in the Kubernetes environment. While many types of API objects are available in Kubernetes by default, it may be desirable to add custom resources. A custom resource is a special type of API object that is generally unavailable in Kubernetes by default and that has one or more characteristics specified in a custom definition file known as a custom resource definition (CRD). Such custom resource definitions and custom resources can be subsequently added to a Kubernetes installation, for example to extend the Kubernetes API.

DETAILED DESCRIPTION

Figure 1:
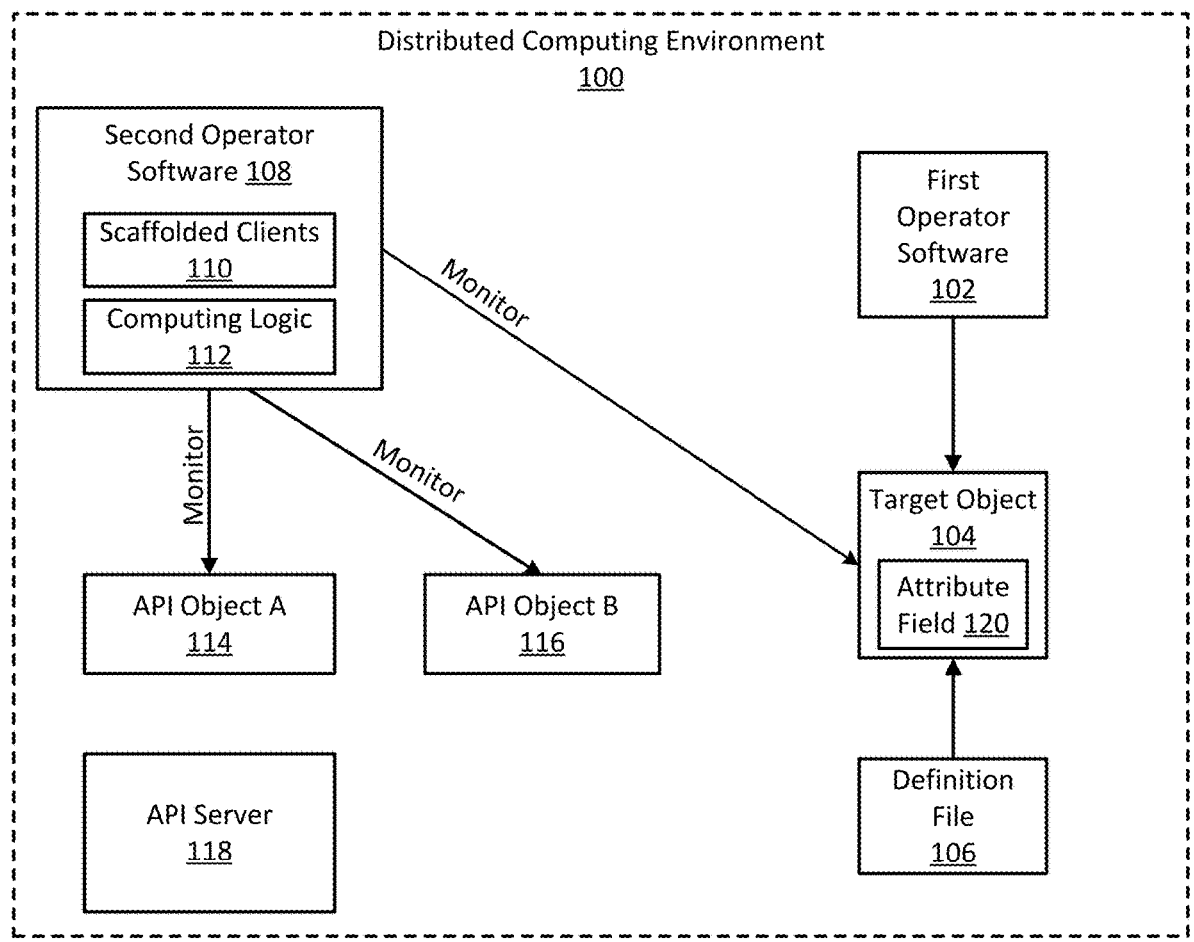
FIG. 1 is a block diagram of an example of a system with a dynamically adjustable operator according to some aspects of the present disclosure.

Some container orchestration platforms such as Kubernetes can allow for objects to be deployed from definition files. The definition files can specify the properties of those objects, including the class (type) of the object. Once the objects are deployed, operators can also be deployed to monitor and perform actions such as reconciliation operations with respect to those objects.

In many container orchestration platforms, each operator is linked to a specific definition file that was used to describe its corresponding object. As a result, each operator may only be capable of monitoring one object or object class at a time and its functionality may be limited to the actions specified in the corresponding definition file. And once an operator has been deployed, the object or object class to which it is assigned usually remains relatively fixed throughout the operator's lifecycle. Changing which object or object class is monitored by a given operator, and that operator's functionality, is normally not possible while the operator is running. Rather, the operator must be shut down and a new operator must be deployed to monitor another object class or perform additional actions. This inflexibility limits how operators can be used in container orchestration systems.

Some examples of the present disclosure can overcome one or more of the abovementioned problems by allowing an operator to dynamically adjust which objects it is monitoring at runtime. This may be achieved through the interplay between two pieces of operator software in the distributed computing environment. More specifically, first operator software may receive a definition file indicating multiple object classes (e.g., types of objects) of interest in the distributed computing system. In some examples involving Kubernetes, the definition file may be a custom resource definition and the object classes may include Deployments and StatefulSets. The first operator software can update an attribute field of a target object to specify the object classes. In this way, the attribute field of the target object can serve as a storage location for maintaining a list of object classes specified in the definition file. The list may be dynamically updated over time by the first operator software in response to changes in the distributed computing environment.

The distributed computing environment can also include second operator software. The second operator software can watch the attribute field of the target object for changes to the list of object classes. At a given point in time, the second operator software can retrieve the list of object classes specified in the attribute field of the target object and begin to monitor some or all of the API objects in the distributed computing environment that match those object classes. Monitoring an API object can involve detecting events related to the API object and, in response, performing one or more corresponding operations. For example, the second operator software can detect an event related to a StatefulSet API object and responsively perform a reconciliation operation in response to the event. Through this process, there can be multiple object classes that are concurrently monitored by the second operator software, while the second operator software is running. Those classes can also be dynamically updated by making changes to the attribute field of the target object.

In some examples, the second operator software may be supplemented with additional computing logic to enable it to monitor the various types of object classes and perform corresponding operations. For example, the second operator software may contain scaffolded clients, which may be libraries or plugins that can impart functions and routines that may not otherwise be present in a default operator deployment. The scaffolded clients may be created from premade templates or using other techniques to expedite their development.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system with a dynamically adjustable operator according to some aspects of the present disclosure. The system includes a distributed computing environment 100, such as a cloud computing environment, computing cluster, or data grid.

The distributed computing environment 100 may include a definition file 106, from which a target object 104 can be deployed. The definition file 106 may define various parameters of the target object 104 according to a predefined schema. In this example, the target object 104 is an API object. The definition file 106 may be provided to an API, which is supported by API server 118 of the distributed computing environment 100, to deploy the target object 104. Once deployed, the target object 104 may have one or more attribute fields 120, such as a status field, that can be updated over time.

Other API objects, such as API object A 114 and API object B 116, may also be deployed in the distributed computing environment 100 using their respective definition files. For example, the API object A 114 may be Deployment object and API object B 116 may be a StatefulSet object, which are two different classes of objects in Kubernetes. The distributed computing environment 100 can include any amount of API objects corresponding to any number of API object classes (e.g., types).

In some examples, the distributed computing environment 100 can deploy first operator software 102 in relation to the target object 104. The first operator software 104 can update attribute fields 120 of the target object 104. For example, the first operator software 102 may scan (e.g., analyze) the definition file 106 for a list of object classes. For instance, the definition file 106 can indicate object classes of interest. The first operator software 104 can determine the object classes of interest based on the definition file 106 and update an attribute field 120 of the target object 104 to list those object classes. Over time, the object classes deployed in the distributed computing environment 100 may change based on the addition of new objects or the removal of existing objects. The first operator software 102 can automatically detect such changes and update the list of object classes in the attribute field 120 accordingly.

The distributed computing environment 100 can also include second operator software 108. The second operator software 108 can dynamically change which objects it is monitoring based on (e.g., to match) the list of object classes in the attribute field 120 of the target object 104. For example, the first operator software 102 may update the attribute field 120 of the target object to specify that a Kubernetes "pod" class should be monitored. The second operator software 108 may detect this change to the attribute field 120 and responsively begin monitoring some or all of the Kubernetes pod objects in the distributed computing environment 100. In some examples, the second operator software 108 may only monitor the object classes listed in the attribute field 120 of the target object 104 and may not monitor any other object classes in the distributed computing environment 100. It will be appreciated that the target object 104 may be of a special class of object that is distinct from the other object classes listed in its attribute field 120. For example, the attribute field 120 may list two object classes that are to be monitored by the second software operator 108, and those two object classes may be different from an object class associated with the target object 104.

The attribute field 120 may be any suitable attribute field of the target object 104. For example, the target object 104 may include a status field that is typically used to describe the current state of the target object 104. But in some examples, the status field may be alternatively used as a mechanism to list a set of object classes. Thus, some examples of the present disclosure may take advantage of existing attribute fields and use them in new ways to implement aspects described herein.

As noted above, the attribute field 120 of the target object 104 may be updated over time to maintain a list of object classes that are to be monitored by the second operator software 108. And the second operator software 108 can monitor the API objects associated with the object classes specified in the attribute field 120. If a new object class is added to the attribute field 120 by the first operator software 102, the second operator software 108 may automatically detect that change and begin monitoring the new object class. For example, the second operator software 108 may be automatically notified of the change through a messaging scheme. Alternatively, the second operator software 108 may periodically poll the attribute field 120 to detect such changes. Either way, the second operator software 108 may automatically become aware of the change and begin monitoring the new object class. Likewise, the second operator software 108 can automatically detect the removal of an existing object class from the attribute field 120. The second operator 108 may automatically detect such as removal based on the messaging scheme or polling scheme described above. In response to detecting the removal of an existing object class from the attribute field 120, the second operator software 108 can then stop monitoring that object class (e.g., stop monitoring API objects of that class type).

For some or all of the object classes that it is monitoring, the second operator software 108 can detect corresponding events and trigger computing operations in response to detecting such events. One example of such an event can include state drift (e.g., when a current state of a monitored object deviates from a target state). In response to detecting such state drift, the second operator software 108 can perform a reconciliation loop for causing the current state to match the target state. The computing operations may be implanted via computing logic 112, such as a reconciliation logic.

As one particular example, the target object 104 may have a Deployment class listed within its attribute field 120. In Kubernetes, Deployments are a special type of API object. The second operator software 108 may determine that the Deployment class is in the attribute field 120 of the target object 104. In response to this determination, the second operator software 108 may begin monitoring some or all of the Deployment objects in the distributed computing environment 100 and trigger reconciliation loops as needed. During the reconciliation loop, the second operator software 108 may serve as the controller manager of the loop. To execute the reconciliation loop, the second operator software 108 may transmit instructions to the API server 118 for causing the reconciliation to occur. In some examples, the second operator software 108 may include a scaffolded controller, which is capable of altering the reconciliation loop from executing a default reconciliation technique to a customized reconciliation technique for a given object class.

In some examples, the second operator software 108 may include scaffolded clients 110 that can help facilitate interactions with the API objects, such as API object A 114 and API object B 116, associated with different object classes. The scaffolded clients 110 may be akin to libraries or functions that can be embedded by a developer into the second operator software 108 to make it more generally applicable to multiple different types of object classes. The scaffolded clients 110 may be developed by a centralized entity and provided to a developer of the second operator software 108 to help reduce the time and complexity involved with updating the second operator software 108 to monitor an expanded set of object classes. In some examples, the scaffolded clients 110 can perform read and write operations according to predefined protocols to help facilitate interactions with the API objects.

Other software tools may also be employed to help developers generate the code (e.g., source code) for the second operator software 108. Such code may include functions and routines that allow the second operator software to read and write to the object classes listed in the attribute field 120 of the target object 104. The tools may be designed to save the developer time or resources. Of course, developers may also have the freedom to apply their own customized logic to the second operator software 108. Some examples of such tools can include the scaffolded clients 110 described above and premade templates.

The efficiency of the scaffolded clients 110 may be enhanced by the second operator software 108 ignoring unknown interface fields when making inferences from the target object 104 for the purpose of creating read operations. For the purposes of creating write operations, the scaffolded client 110 may leverage exiting patch mechanics of the distributed computing environment 100 by generating a patch between the API object initially detected in the attribute field 120 of the target object 104 by the second operator software 108 and the modified resource present in the API object A 114.

In some examples, a software tool may be provided to developers to facilitate the generation of a definition file 106 for deploying the target object 104. The tool may create the definition file 106 by analyzing (e.g., parsing) any suitable data structure, such as a GoLang file, a YAML file, a JSON file, or a source code file written in a programming language. From the data structure, the tool can automatically generate (partially or fully) the definition file 106. In some examples, the tool may be able to achieve a partially or fully realized definition file 106 by reading information in the data structure, extracting meaningful, applicable data from the data structure, and using the extracted data within a predefined template to create the definition file 106. In some examples, the tool may rely on user input or metadata information, such as a name of the target object 104 and any metadata related to the target object 104, to facilitate generation of the definition file 106. A definition file 106 created in this way can specify which API are to be deployed and monitored by the second operator software 108. The tool may configure the definition file 106 with a structure that optimizes tracking of multiple resources by the second operator software 108. For example, a target object 104 may not be defined, but may exist as a class in the data structure defined by the developer. In spite of this, the tool can generate a definition file 106 corresponding to the class based on the data structure.

In some examples, the software tools described above may be used to facilitate the development of other kinds of the software programs (other than the second operator software 108) that can interact with the object classes and objects in the distributed computing environment 100. For example, a software developer can use the software tools to create a mobile application or a software service that is configured to execute outside the boundaries of the distributed computing environment 100. In some particular, the software developer can leverage the software tools to allow the software program to more easily interact with different objects and object classes in the distributed computing environment 100.

Figure 2:
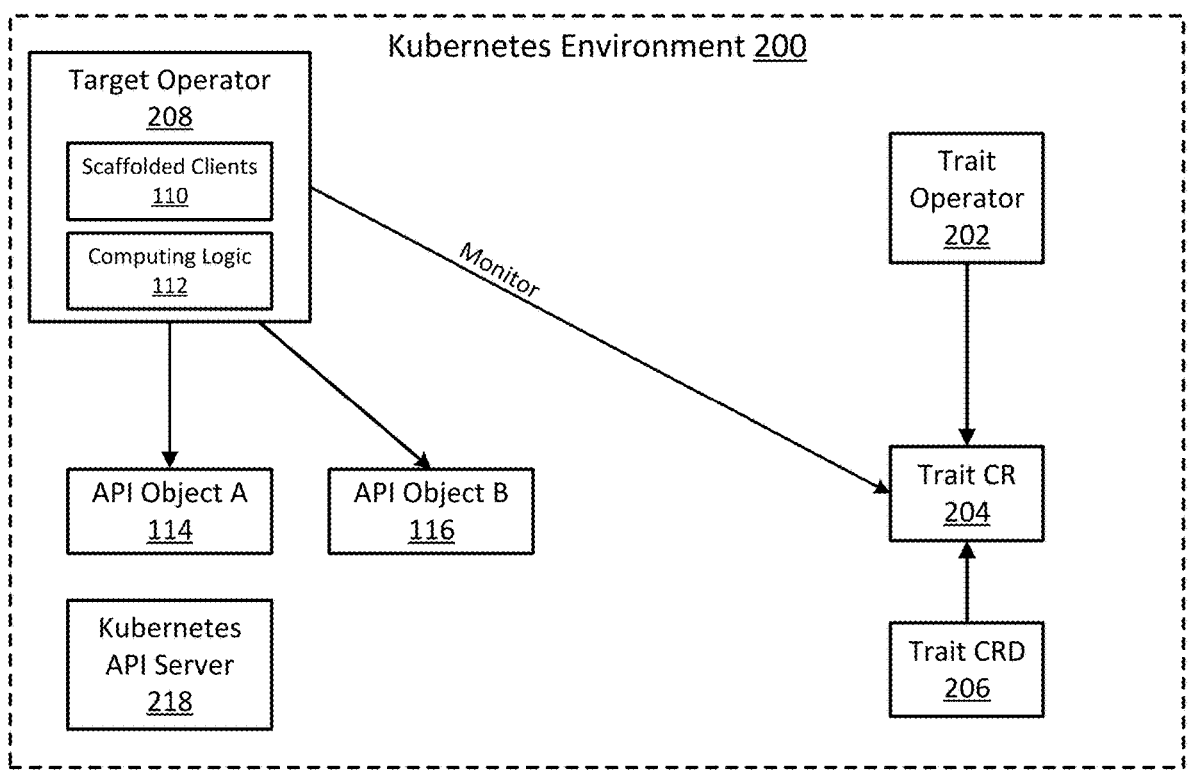
FIG. 2 is a block diagram of an example of a Kubernetes system with a dynamically adjustable operator according to some aspects of the present disclosure.

FIG. 2 is a block diagram of an example of a system with a dynamically adjustable operator according to some aspects of the present disclosure. In this example, the system includes a Kubernetes environment 200. The Kubernetes environment 200 includes a trait operator 202 that may behave similarly to the first operator software 102 of FIG. 1, a trait custom resource 204 that may behave similarly to the target object 104 of FIG. 1, a trait custom resource definition 206 that may behave similarly to the definition file 106 of FIG. 1, and a Kubernetes API server 218 that may behave similarly to the API server 118 of FIG. 1. For example, the trait operator 202 may update an attribute field of the trait custom resource 204 to include a list of object classes specified in the trait custom resource definition 206.

The Kubernetes environment 200 also includes a target operator 208 that may behave similarly to the second operator software 108 of FIG. 1. For instance, the target operator 208 can determine that API Object A is of a particular object class that is specified in the attribute fields of the Trait custom resource 204. So, the target operator 208 can monitor API Object A 114 to ensure that it does not drift from a target state, which may be specified in a custom resource definition associated with API Object A 114. It will be appreciated that the custom resource definition for API Object A will be different from the trait custom resource definition 206 of the trait custom resource 204. The target operator 208 can also dynamically change which objects and object classes it is monitoring based the current list of object classes specified in the attribute field of the trait custom resource 204.

Figure 3:
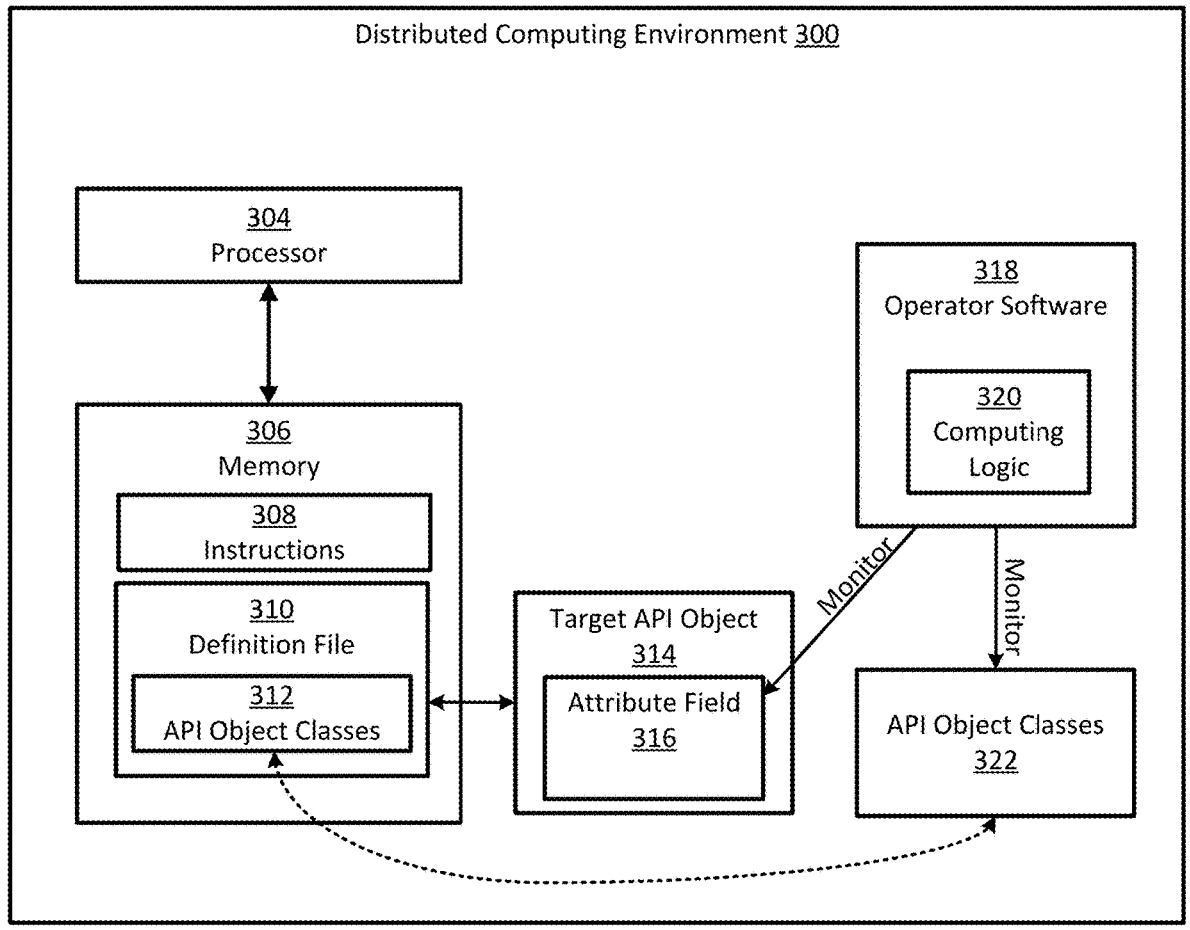
FIG. 3 is a block diagram of an example of a system configured to implement some aspects of the present disclosure.

FIG. 3 is a block diagram of an example of a system configured to implement some aspects of the present disclosure. The system includes a processor 304 that may be communicatively coupled to a memory 306. In some examples, the processor 304 and the memory 306 can be part of the same computing device. In other examples, the processor 304 and the memory 306 can be distributed from (e.g., remote to) one another.

The processor 304 can include one processor or multiple processors. Non-limiting examples of the processor 304 include a Field-Programmable Gate Array (FPGA), an application-specific integrated circuit (ASIC), a microprocessor, etc. The processor 304 can execute instructions 308 stored in the memory 306 to perform operations. In some examples, the instructions 308 can include processor-specific instructions generated by a compiler or an interpreter from code written in a suitable computer-programming language, such as C, C++, C#, etc.

The memory 306 can include one memory or multiple memories. The memory 306 can be non-volatile and may include any type of memory that retains stored information when powered off. Non-limiting examples of the memory 306 include electrically erasable and programmable read-only memory (EEPROM), flash memory, or any other type of non-volatile memory. At least some of the memory 306 can include a non-transitory computer-readable medium from which the processor 304 can read instructions 308. A computer-readable medium can include electronic, optical, magnetic, or other storage devices capable of providing the processor 304 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 308.

In some examples, the processor 304 can execute the instructions 308 to perform some or all of the functionality described herein. For example, the processor 304 can receive a definition file 310 for a target API object 314. The definition file 310 may identify application program interface (API) object classes 312, such as a StatefulSet or Deployment. The processor 304 can determine the API object classes 312 specified in the definition file 310, for example by opening the definition file 310 and extracting that information from it. The processor 304 can then update an attribute field 316 associated with the target API object 314 to specify the API object classes 312. Operator software 318 in the distributed computing environment 300 can monitor the API object classes 322 (e.g., the API objects matching the API object classes 312) specified in the attribute field 316 of the target API object 314 and execute computing logic 320 in response to events related to the API object classes 322.

Figure 4:
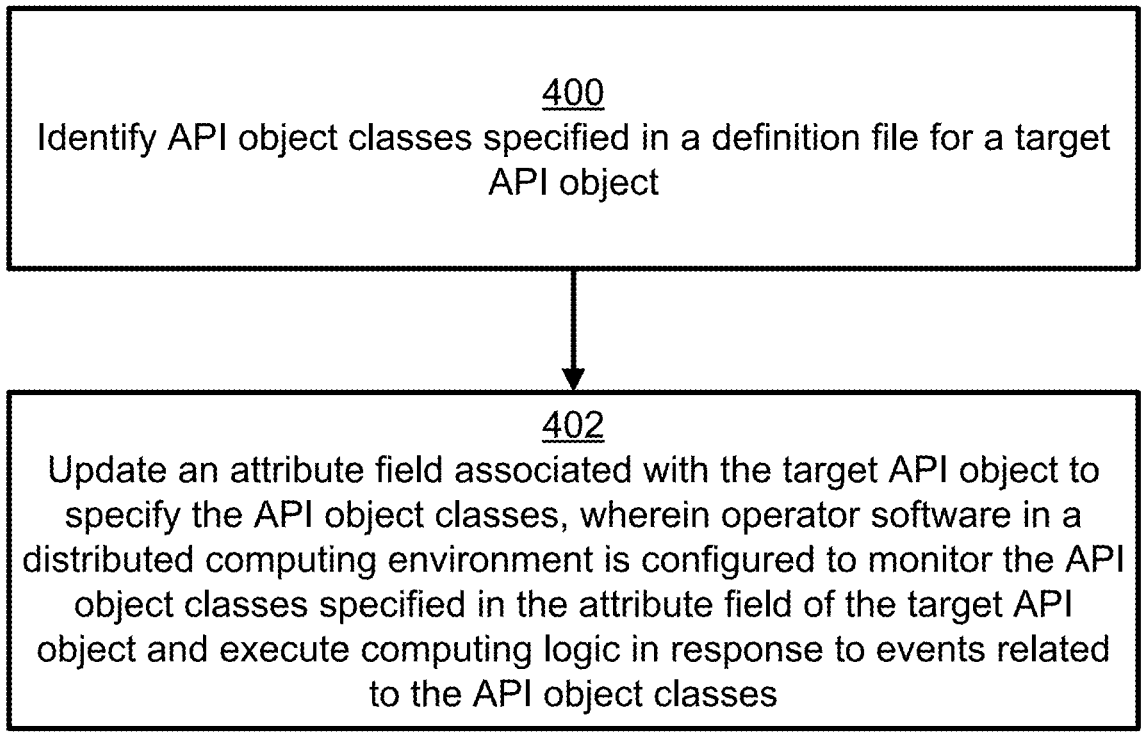
FIG. 4 is a flow chart of an example of a process for implementing some aspects of the present disclosure.

FIG. 4 is a flow chart of an example of a process for implementing some aspects of the present disclosure. In some examples, the processor 304 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 400, the processor 304 identifies one or more API object classes 312 specified in a definition file 310 for a target API object 314. For example, the processor may receive the definition file 310 and analyze the definition file 310 to identify the API object classes 312.

In some examples, the distributed computing environment 300 may include a container orchestration platform, and the target API object 314 may be a custom object that extends the API of the container orchestration platform. In some such examples, the definition file 310 may include parameter values for the target API object 314.

In block 402, the processor 304 updates an attribute field 316 associated with the target API object 314 to specify the API object classes 312. Operator software 318 in the distributed computing environment 300 can monitor the API object classes 322 and execute computing logic 320 in response to events related to the API object classes 322. The computer logic 320 may be executable by the processor 304 to implement reconciliation operations with respect to the API object classes 322. In some examples, the attribute field 316 may be a status field of the target API object 314.

In some examples, the operator software 318 may be second operator software that is distinct from first operator software configured to perform operations on the target API object 314. The first operator software may update the API object classes 312 for the second operator software 318 to monitor. As an example, the object classes 312 specified in the attribute field 316 may be Deployments, StatefulSets, and Pods, which are three specific kinds of Kubernetes object classes. The second operator software 318 can monitor those three object classes based on their presence in the attribute field 316. In this way, the updates to the attributes field 316 made by the first operator software can influence the object classes monitored by the second operator software 318.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor for causing the processor to perform operations including:
   extracting a list of application programming interface (API) object classes from a definition file, wherein the definition file includes the list of API object classes, and wherein the definition file also includes characteristics for a target API object, the definition file being usable to deploy the target API object with the characteristics; and
   based on extracting the list, updating an attribute field of the target API object to specify the API object classes, wherein operator software in a distributed computing environment is configured to:
      obtain the list of API object classes from the attribute field of the deployed target API object;
      based on obtaining the list of API object classes from the attribute field of the deployed target API object, monitor the object classes specified in the list for events; and
      execute computing logic in response to detecting the events related to the object classes.

2. The non-transitory computer-readable medium of claim 1, wherein the operations further comprise:
   receiving the definition file;
   analyzing the definition file to identify the API object classes; and
   updating the attribute field to specify the API object classes.

3. The non-transitory computer-readable medium of claim 1, wherein the operator software is second operator software, wherein first operator software is configured to perform the operations, the first operator software being different from the second operator software, and wherein the target API object is of an object class that is different from the object classes specified in the definition file.

4. The non-transitory computer-readable medium of claim 1, wherein the distributed computing environment includes a container orchestration platform, the target API object is a custom object that extends an API of the container orchestration platform, and the definition file includes parameter values for the target API object.

5. The non-transitory computer-readable medium of claim 4, wherein the container orchestration platform is Kubernetes, the target API object is a custom resource in Kubernetes, and the definition file is a custom resource definition for the custom resource.

6. The non-transitory computer-readable medium of claim 1, wherein the attribute field is a status field of the target API object.

7. The non-transitory computer-readable medium of claim 1, wherein the computing logic is configured to implement reconciliation operations with respect to the object classes.

8. The non-transitory computer-readable medium of claim 1, wherein the operations involve:
   detecting an event in the distributed computing environment; and
   in response to detecting the event:
      identifying an updated set of API object classes; and
      updating the attribute field associated with the target API object to specify the updated set of API object classes, wherein the operator software in the distributed computing environment is configured to monitor the updated set of API object classes specified in the attribute field and execute the computing logic in relation to the updated set of API object classes.

9. A method comprising:
   extracting, by a processor, a list of application programming interface (API) object classes from a definition file, wherein the definition file includes the list of API object classes, and wherein the definition file also includes characteristics for a target API object, the definition file being usable to deploy the target API object with the characteristics; and
   based on extracting the list, updating, by the processor, an attribute field of the target API object to specify the API object classes, wherein operator software in a distributed computing environment:
      obtains the list of API object classes from the attribute field of the deployed target API object;
      based on obtaining the list of API object classes from the attribute field of the deployed target API object, monitors the API object classes specified in the list for events; and
      executes computing logic in response to detecting the events related to the API object classes.

10. The method of claim 9, further comprising:
    receiving the definition file;
    analyzing the definition file to identify the API object classes; and
    updating the attribute field to specify the API object classes.

11. The method of claim 9, wherein the operator software is second operator software, wherein first operator software is configured to monitor the API object classes specified in the attribute field of the target API object and execute computer logic in response to the events related to the API object classes, the first operator software being different from the second operator software, and wherein the target API object is of an object class that is different from the API object classes specified in the definition file.

12. The method of claim 9, wherein the distributed computing environment includes a container orchestration platform, the target API object is a custom object that extends an API of the container orchestration platform, and the definition file includes parameter values for the target API object.

13. The method of claim 12, wherein the container orchestration platform is Kubernetes, the target API object is a custom resource in Kubernetes, and the definition file is a custom resource definition for the custom resource.

14. The method of claim 9, wherein the attribute field is a status field of the target API object.

15. The method of claim 9, wherein the computing logic is configured to implement reconciliation operations with respect to the API object classes.

16. The method of claim 9, further comprising:
    detecting an event in the distributed computing environment; and
    in response to detecting the event:
       identifying an updated set of API object classes; and
       updating the attribute field associated with the target API object to specify the updated set of API object classes, wherein the operator software in the distributed computing environment is configured to monitor the updated set of API object classes specified in the attribute field and execute the computing logic in relation to the updated set of API object classes.

17. A system comprising:
    a processor; and
    a memory device including instructions executable by the processor for causing the processor to perform operations including:
       extracting a list of application programming interface (API) object classes from a definition file, wherein the definition file includes the list of API object classes, and wherein the definition file also includes characteristics for a target API object, the definition file being usable to deploy the target API object with the characteristics; and
       based on extracting the list, updating an attribute field associated with the target API object to specify the list of API object classes,
    wherein operator software in a distributed computing environment is configured to:
       obtain the list of API object classes from the attribute field of the deployed target API object;
       based on obtaining the list of API object classes from the attribute field of the deployed target API object, monitor the API object classes specified in the list for events; and
       execute computing logic in response to detecting the events related to the API object classes.

18. The system of claim 17, wherein the memory device further includes instructions that are executable by the processor for causing the processor to:
    receive the definition file;
    analyze the definition file to identify the API object classes; and
    update the attribute field to specify the API object classes.

19. The system of claim 17, wherein the operator software is second operator software, wherein first operator software is configured to perform the operations, the first operator software being different from the second operator software, and wherein the target API object is of an object class that is different from the API object classes specified in the definition file.

20. The system of claim 17, wherein the distributed computing environment includes a container orchestration platform, the target API object is a custom object that extends an API of the container orchestration platform, and the definition file includes parameter values for the target API object.

\* \* \* \* \*